(12) United States Patent
Sakai

(10) Patent No.: US 8,422,051 B2
(45) Date of Patent: Apr. 16, 2013

(54) DEVICE, CONTROL METHOD THEREOF, COMPUTER PROGRAM, AND STORAGE MEDIUM FOR DIFFERENTIALLY PROCESSING SEARCH REQUESTS

(75) Inventor: Tetsuo Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1385 days.

(21) Appl. No.: 11/448,069

(22) Filed: Jun. 7, 2006

(65) Prior Publication Data

US 2006/0274371 A1    Dec. 7, 2006

(30) Foreign Application Priority Data

Jun. 7, 2005   (JP) .................................. 2005-167346

(51) Int. Cl.
*G06F 3/12* (2006.01)
(52) U.S. Cl.
USPC .......... 358/1.15; 358/1.1; 358/296; 358/1.13; 358/1.16; 707/644; 707/663; 707/662
(58) Field of Classification Search ................. 358/1.13, 358/1.16, 1.1, 1.15, 296; 707/10, 1, 9, 662, 707/663, 664
See application file for complete search history.

(56) References Cited

U.S. PATENT DOCUMENTS

| | | | | |
|---|---|---|---|---|
| 6,587,836 | B1* | 7/2003 | Ahlberg et al. | 705/26 |
| 7,661,128 | B2* | 2/2010 | Chen et al. | 726/5 |
| 2002/0089691 | A1* | 7/2002 | Fertlitsch et al. | 358/1.15 |
| 2003/0212783 | A1 | 11/2003 | Sakai | 709/223 |
| 2004/0190057 | A1* | 9/2004 | Takahashi et al. | 358/1.15 |
| 2005/0134896 | A1* | 6/2005 | Koga | 358/1.14 |
| 2005/0165759 | A1 | 7/2005 | Sakai | 707/3 |
| 2005/0259288 | A1* | 11/2005 | Minato | 358/1.13 |
| 2006/0225130 | A1* | 10/2006 | Chen et al. | 726/5 |
| 2006/0274358 | A1* | 12/2006 | Fukui et al. | 358/1.15 |

FOREIGN PATENT DOCUMENTS

| | | |
|---|---|---|
| JP | 2001-331396 A | 11/2001 |
| JP | 2002-149362 A | 5/2002 |
| JP | 2003-288189 A | 10/2003 |
| JP | 2004-110375 | 4/2004 |
| JP | 2004171228 A | 6/2004 |
| JP | 2007502092 A | 2/2007 |
| WO | 2004104759 A | 12/2004 |

OTHER PUBLICATIONS

Sakamoto Yoichi, Network Device, Control Method Therefor and Storage Medium, Nov. 30, 2001, JP2001-331396.*
Nakayama Hidetoshi, Printer User Limiting System, May 24, 2002, JP2002-149362.*
Hosoda Yasuhiro, Network Device, Network Device Management System, Network Device Management Method and Control Method for the Network Device, Oct. 10, 2003, JP2003-288189.*

* cited by examiner

*Primary Examiner* — Benny Q Tieu
*Assistant Examiner* — Martin Mushambo
(74) *Attorney, Agent, or Firm* — Fitzpatrick, Cella, Harper & Scinto

(57) ABSTRACT

Identification information of a user who performs search is shared between an information processing apparatus and a device. When search from the user having the identification information is accepted, the device responds. At this time, when the condition for sending back a response can be set from both the information processing apparatus and device and is satisfied, the device transmits device information to the information processing apparatus.

8 Claims, 15 Drawing Sheets

F I G. 3
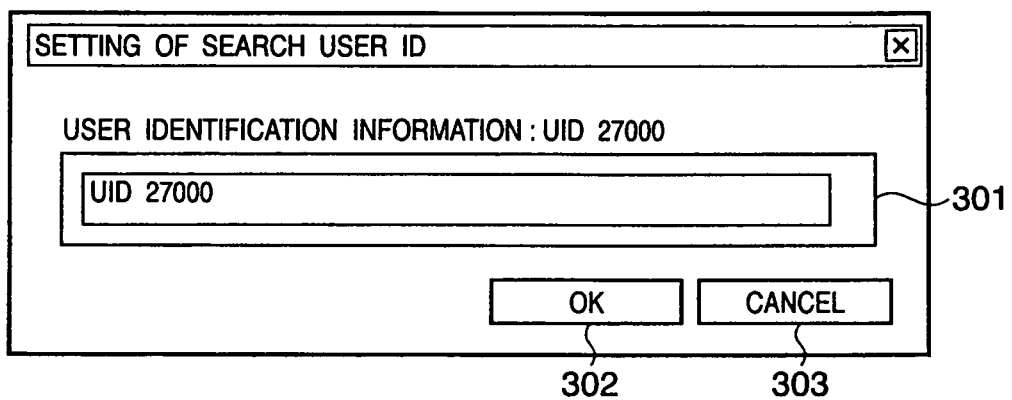

FIG. 6

| | | |
|---|---|---|
| UID | UID27000 | 601 |
| Flag | 1 | 602 |
| DESIGNATED COUNT | 1 | 603 |
| DESIGNATED TIME | 2 | 604 |
| SETTING DATE & TIME | 2004 / 12 / 01  19 : 10 | 605 |
| DESIGNATED DATE | 2004 / 12 / 31 | 606 |
| SEARCH COUNT | 0 | 607 |
| UID | UID27010 | |
| Flag | 2 | |
| DESIGNATED COUNT | 5 | |
| DESIGNATED TIME | 3 | |
| SETTING DATE & TIME | 2004 / 11 / 10  11 : 38 | |
| DESIGNATED DATE | 2004 / 12 / 10 | |
| SEARCH COUNT | 3 | |
| UID | UID27020 | |
| Flag | 4 | |
| DESIGNATED COUNT | 2 | |
| DESIGNATED TIME | 5 | |
| SETTING DATE & TIME | 2004 / 11 / 20  15 : 55 | |
| DESIGNATED DATE | 2004 / 12 / 20 | |
| SEARCH COUNT | 1 | |
| . | . | |
| . | . | |
| . | . | |

F I G. 11
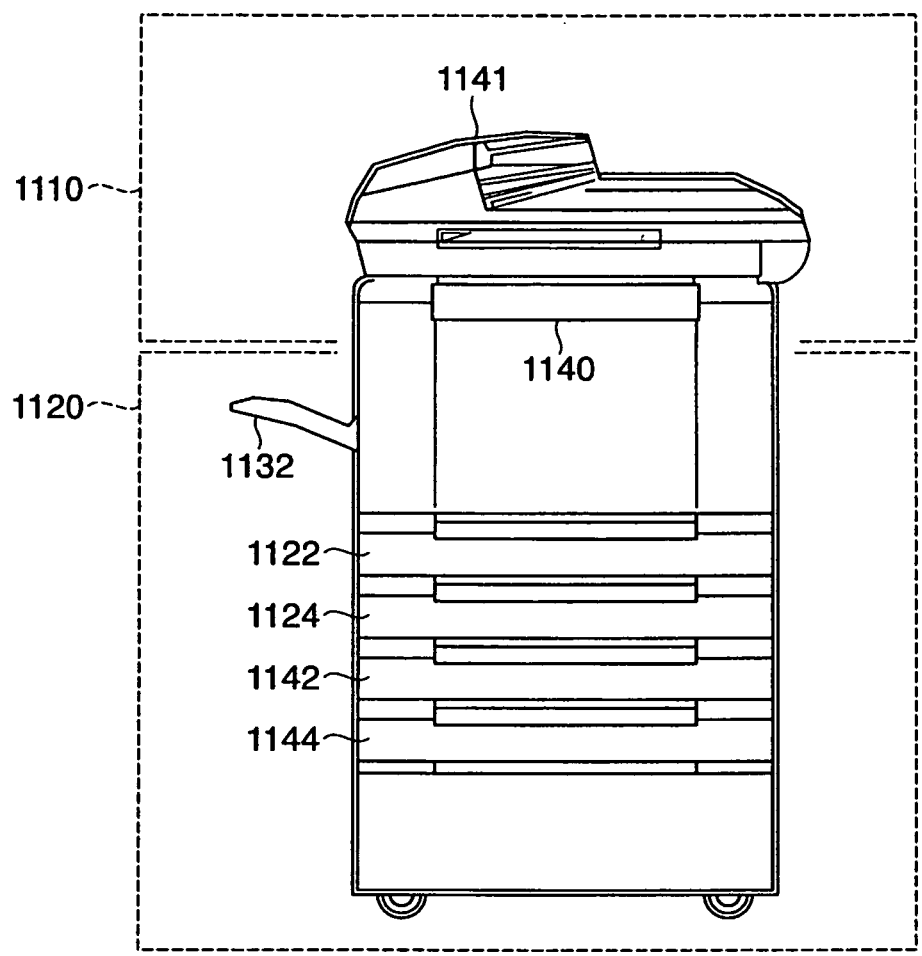

DEVICE, CONTROL METHOD THEREOF, COMPUTER PROGRAM, AND STORAGE MEDIUM FOR DIFFERENTIALLY PROCESSING SEARCH REQUESTS

FIELD OF THE INVENTION

The present invention relates to an information processing apparatus, device, control method thereof, computer program, and storage medium.

BACKGROUND OF THE INVENTION

Conventionally, in order to acquire information on a printing apparatus connected to a network, a printing apparatus management tool or the like is used to search for a printing apparatus on the network.

An example of the search method is a broadcast search method of embedding a search condition in a broadcast packet and listing responding printing apparatuses. Another example is a method of listing, by multicast search using SLP (Service Location Protocol), printing apparatuses which support a specific service type.

According to these methods, when the user wants to know information such as the IP address of a nearest printing apparatus in executing search for a printing apparatus (for example, when the user is to acquire information on the IP address of a printing apparatus that is necessary to create a TCP/IP port for use in installing a printer driver), a printing apparatus management utility searches for a printing apparatus. In this search, even information on an unnecessary printing apparatus on the network is detected, and the user must find out necessary information (e.g., the IP address of the printing apparatus) from the pieces of detected information.

There is also proposed a method of operating the local panel of a printing apparatus to execute status print or the like, and acquiring information such as the IP address of the printing apparatus. According to this method, the user must perform a panel operation for each printing apparatus. The menu layout on the local panel may change between models of printing apparatuses, and the status print operation itself is often cumbersome for users except one who is familiar with the operation.

As a method of providing printing apparatus information collected in the above way, there is proposed a method of displaying the function icons of devices on the device list display, enabling rearrangement and extraction, and providing a device list for each function to the user, so as to allow the user to easily select a device in terms of the device function (see Japanese Patent Laid-Open No. 2004-110375).

However, this printing apparatus information providing method does not display only a desired device designated by the user, and the user must find out the desired device from a plurality of displayed devices.

SUMMARY OF THE INVENTION

It is an object of the present invention to efficiently search for a desired device designated by the user, and save the user from finding out a desired device from devices displayed as search results.

An invention corresponding to one of preferred embodiments is an information processing apparatus which can communicate with a plurality of devices via a network, comprising, a transmitting unit, adapted to transmit, to the plurality of devices, a request of acquiring pieces of device information of the devices, a setting unit, adapted to set, as a condition in the request transmitted by the transmitting unit, identification information inputted by a user to the device and a display unit, adapted to display the device information transmitted in response to the request from a device which satisfies the condition, wherein the identification information can be used as the condition within a predetermined number of times or during a predetermined period.

An invention corresponding to another one of preferred embodiments is a device which can communicate with an information processing apparatus via a network, comprising, a storage unit, adapted to store device information on the device, a registration acceptance unit, adapted to accept registration of identification information inputted by a user, a condition registration acceptance unit adapted to accept registration of a first condition representing a number of times or period where the identification information is valid, a transmission request receiving unit adapted to receive a request of transmitting the device information from the information processing apparatus, a judging unit adapted to judge whether the received transmission request contains the identification information whose registration is accepted by the registration acceptance unit, and a transmitting unit adapted to transmit the device information to the information processing apparatus when the judging unit judges that the identification information is contained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of a user identification information input window corresponding to the embodiment of the present invention;

FIG. 6 is a table showing an example of the structure of a management table for managing attribute information corresponding to the embodiment of the present invention;

FIG. 11 is a view showing an example of the outer appearance of the printing apparatus 104 corresponding to the embodiment of the present invention;

DETAILED DESCRIPTION OF THE PREFERRED EMBODIMENTS

Preferred embodiments of the present invention will now be described in detail in accordance with the accompanying drawings.

Figure 1:
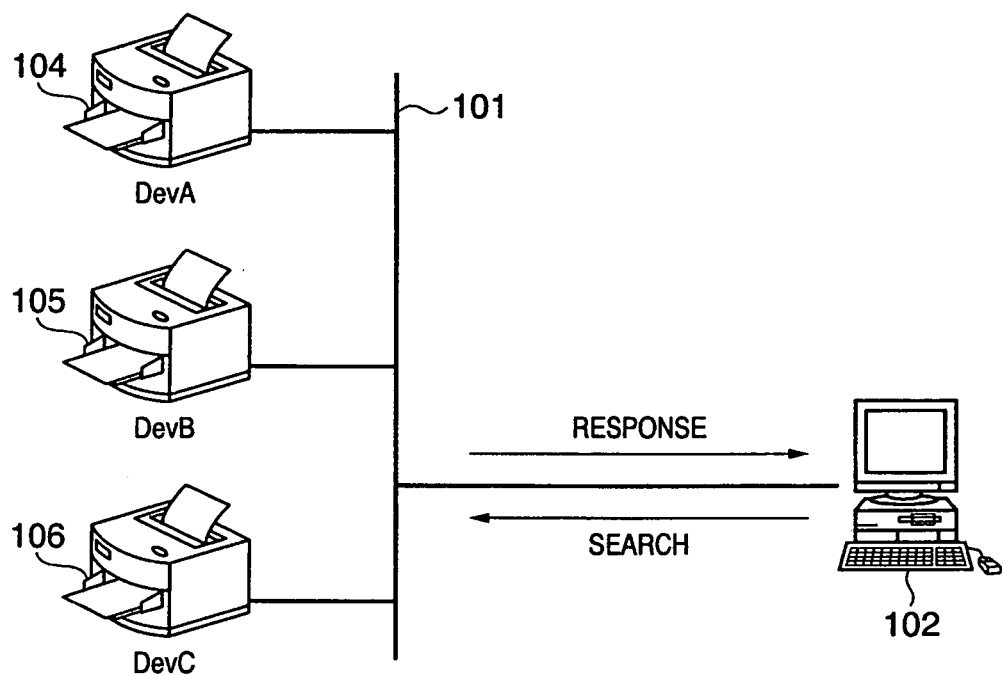
FIG. 1 is a view showing an example of the configuration of a system made up of an information processing apparatus and device corresponding to an embodiment of the present invention.

FIG. 1 is a view showing an example of the configuration of a system built by connecting via a network an information processing apparatus and device corresponding to an embodiment. Reference numeral 101 denotes a network communication medium such as Ethernet®. A plurality of information processing apparatuses and a plurality of printing apparatuses are connected to the network 101. Reference numeral 102 denotes a host computer serving as an information processing apparatus. A device management program corresponding to the embodiment and the like are executed in the host computer 102. In the embodiment, the host computer 102 suffices to be an information processing apparatus connectable to the network 101. Hence, the host computer 102 includes an apparatus (e.g., a general-purpose desktop or laptop personal computer) connectable to the network 101 by wire/wireless communication, a cell phone connectable to the network 101 by wireless communication, and a portable information terminal device such as a PDA.

Reference numerals 104 to 106 denote printing apparatuses serving as devices connected to the network 101. In the following description, the printing apparatus 104 will typify these printing apparatuses. The description contents of the printing apparatus 104 equally apply to the remaining printing apparatuses on the network 101.

The printing apparatus 104 responds to a device search request from the device management program running on the host computer 102. Note that the printing apparatus 104 may be a laser beam printer which adopts electrophotography as a printing method, an inkjet printer which adopts an inkjet printing method, or a Bubble-Jet® printer. The printing apparatus 104 is not limited to an apparatus dedicated to printing, but also includes a multifunction apparatus having the scanner function, facsimile function, copying function, and the like.

The device corresponding to the embodiment is not limited to one having the printing function, but may be a scanner apparatus having only the scanner function, a facsimile apparatus, a copying apparatus, or the like. That is, any apparatus can be employed as far as the present invention can be applied by constructing the relationship between the host computer 102 and a host device.

One of network management protocols suitable for the system corresponding to the embodiment is a simple network management protocol (to be simply referred to as "SNMP" hereinafter).

By an SNMP network management operation, the user can use a network management utility on the host computer 102 serving as a manager to communicate with agent software on a managed node and acquire or change information on the printing apparatus 104 via the network 101.

More specifically, when the user requests management data of the printing apparatus 104 on the network 101, management software embeds object identification information in a management packet or frame, and sends it to a target agent. The agent interprets the object identification information, extracts data corresponding to the object identification information, embeds the data in a packet, and sends it back to the user. In some cases, a corresponding process is called to extract data.

The device provides MIB information in response to an information request issued from the network management utility. The network management utility reads out information such as the device state, name, and function from the MIB information provided by the device, and presents the information to the user.

Figure 14:
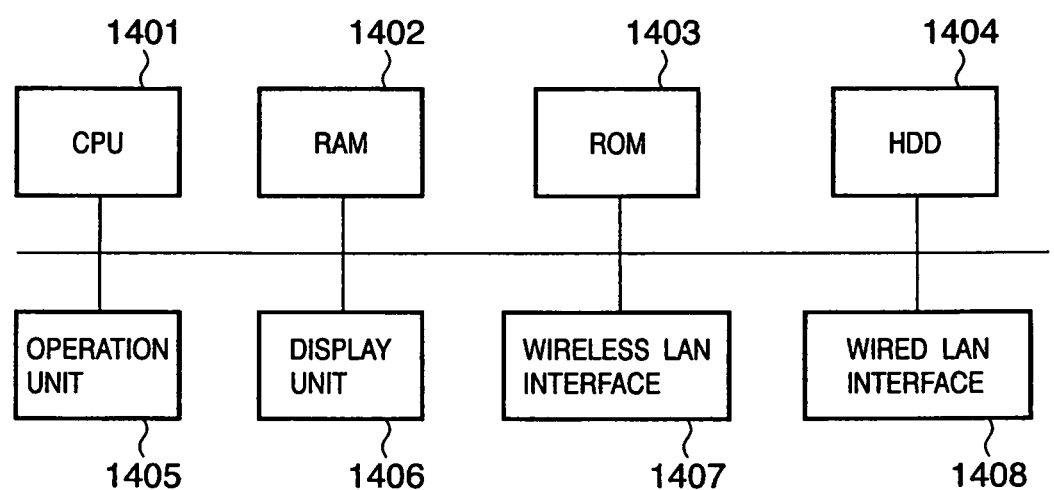
FIG. 14 is a block diagram showing an example of the hardware configuration of the host computer 102 corresponding to the embodiment of the present invention.

The hardware configuration of the host computer 102 corresponding to the embodiment will be explained with reference to FIG. 14. In FIG. 14, reference numeral 1401 denotes a CPU which is a control means for controlling the overall host computer 102. Reference numeral 1402 denotes a RAM which is a work memory for operating the CPU 1401. Reference numeral 1403 denotes a ROM which stores the boot program of the host computer 102. Reference numeral 1404 denotes a hard disk drive (HDD) which stores system software, application data, and a printing apparatus management program corresponding to the embodiment. Reference numeral 1405 denotes an operation unit which is made up of a keyboard and a mouse or point pad for accepting an instruction input from the user of the host computer 102. Reference numeral 1407 denotes a wireless LAN interface which is a communication means for performing communication via a wired LAN 105. Reference numeral 1408 denotes a wired LAN interface which is a communication means for performing communication via the network 101.

The concrete configuration of the printing apparatus 104 corresponding to the embodiment will be explained. In the following description, a multifunction apparatus having the scanner function and printing function will be explained as the printing apparatus 104. FIG. 11 is a view showing the appearance of the printing apparatus 104 implemented as a multifunction apparatus.

In FIG. 11, a scanner unit 1110 serving as an image input device irradiates a document image with a document illumination lamp, reads it with a CCD line sensor, converts it into an electrical signal, and processes the electrical signal as image data. Document paper sheets are set on a document feeder (automatic document feeder) 1141, and the user of the apparatus inputs a read start instruction from an operation unit 1140. Then, the feeder 1141 feeds the document paper sheets one by one to read a document image.

A printer unit 1120 serving as an image output device converts image data into an image on a paper sheet. The embodiment will describe electrophotography using a photosensitive drum and photosensitive belt. However, the printer unit 1120 may employ, e.g., an inkjet method of discharging ink from a small nozzle array to directly print an image on a paper sheet. A printing operation starts in response to an instruction from a controller (to be described later) in the apparatus. The printer unit 1120 has a plurality of feed stages so as to select different paper sizes or different paper orientations, and is equipped with corresponding paper cassettes 1122, 1124, 1142, and 1144. A paper sheet bearing an image is discharged onto a delivery tray 1132.

An example of the internal configuration of the printing apparatus 104 shown in FIG. 11 will be explained with reference to the sectional view shown in FIG. 12.

In the scanner unit 1110 of FIG. 11, reference numeral 1201 denotes a glass document table on which document sheets fed from the document feeder 1141 are sequentially set at a predetermined position. Reference numeral 1202 denotes a document illumination lamp which is formed from, e.g., a halogen lamp and exposes a document set on the glass document table 1201. Reference numerals 1203, 1204, and 1205 denote scanning mirrors which are stored in an optical scanning unit (not shown) and guide light reflected by a document to a CCD unit 1206 while reciprocating. The CCD unit 1206 is made up of, e.g., an imaging lens 1207 which forms light reflected by a document into an image on a CCD (Charge-Coupled Device), an image sensing element 1208 which is formed from a CCD image sensor, and a CCD driver 1209 which drives the image sensing element 1208. An image signal output from the image sensing element 1208 is converted into, e.g., 8-bit digital data, and the digital data is inputted to a controller unit 1239. The controller unit 1239 comprises a microcomputer, image processing unit, and the like (to be described later), and performs an image forming operation in accordance with an instruction from the operation unit 1140 which accepts an operation from the user.

Figure 12:
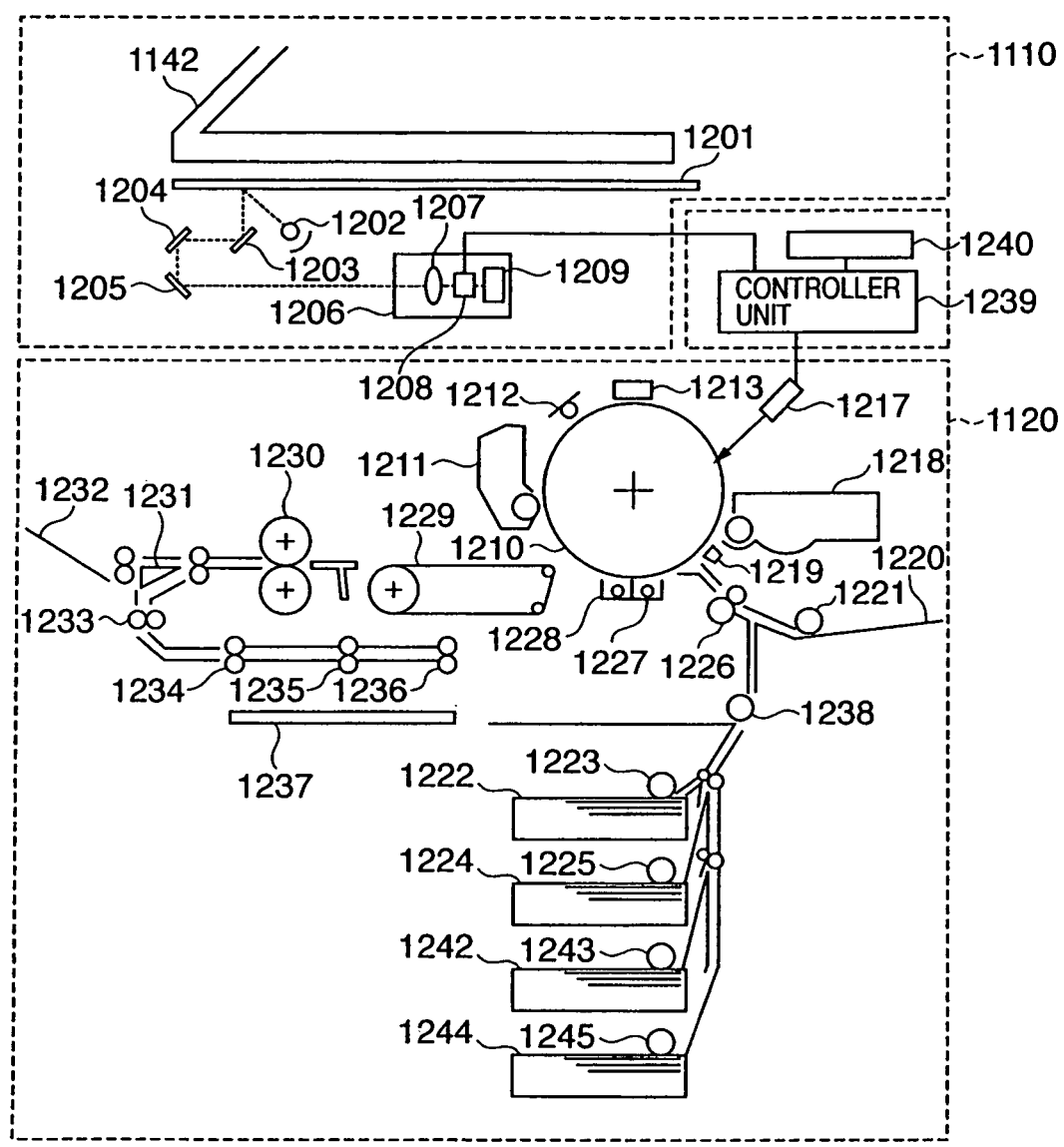
FIG. 12 is a sectional view showing an example of the internal structure of the printing apparatus 104 corresponding to the embodiment of the present invention.

In the printer unit 1120 of FIG. 12, reference numeral 1210 denotes a photosensitive drum which is discharged by a pre-exposure lamp 1212 in preparation for image formation. Reference numeral 1213 denotes a primary charger which uniformly charges the photosensitive drum 1210. Reference numeral 1217 denotes an exposure means which is formed from a semiconductor laser or the like, and forms an electrostatic latent image by exposing the photosensitive drum 1210 on the basis of image data processed by the controller unit 1239 for controlling image formation and the whole apparatus. Reference numeral 1218 denotes a developing unit which contains a black developing agent (toner). Reference numeral 1219 denotes a pre-transfer charger which applies a high voltage before a toner image developed on the photosensitive drum 1210 is transferred onto a paper sheet.

Reference numerals 1220, 1222, 1224, 1242, and 1244 denote feed units (1220 denotes a manual feed unit). Transfer paper sheets are fed into the apparatus by driving pickup rollers 1221, 1223, 1225, 1243, and 1245, temporarily stop at the arrangement position of a registration roller 1226, and fed again in synchronism with the write timing of an image formed on the photosensitive drum 1210. Reference numeral 1227 denotes a transfer charger which transfers a toner image developed on the photosensitive drum 1210 onto a fed transfer paper sheet. Reference numeral 1228 denotes a separation charger which separates a transfer paper sheet having undergone the transfer operation from the photosensitive drum 1210. Toner which is not transferred and remains on the photosensitive drum 1210 is recovered by a cleaner 1211. Reference numeral 1229 denotes a convey belt which conveys a transfer paper sheet having undergone the transfer process to a fixing unit 1230. The fixing unit 1230 fixes toner transferred on a transfer paper sheet by, e.g., heat. Reference numeral 1231 denotes a flapper which controls the convey path of a transfer paper sheet having undergone the fixing process to the arrangement direction of a sorter 1232 or intermediate tray 1237.

Reference numerals 1233 to 1236 denote feed rollers which feed a transfer paper sheet having temporarily undergone the fixing process onto the intermediate tray 1237 after reversing the paper sheet (multiple) or without reversing it (double-sided). Reference numeral 1238 denotes a refeed roller which conveys a transfer paper sheet set on the intermediate tray 1237 to the arrangement position of the registration roller 1226 again.

An example of the configuration of the controller unit 1239 in FIG. 12 will be explained with reference to FIG. 13. The controller unit 1239 connects to the scanner unit 1110 serving as an image input device and the printer unit 1120 serving as an image output device. By connecting to the network 101, the controller unit 1239 receives a device information transmission request (search request) from the host computer 102, and controls a response to the request.

Figure 13:
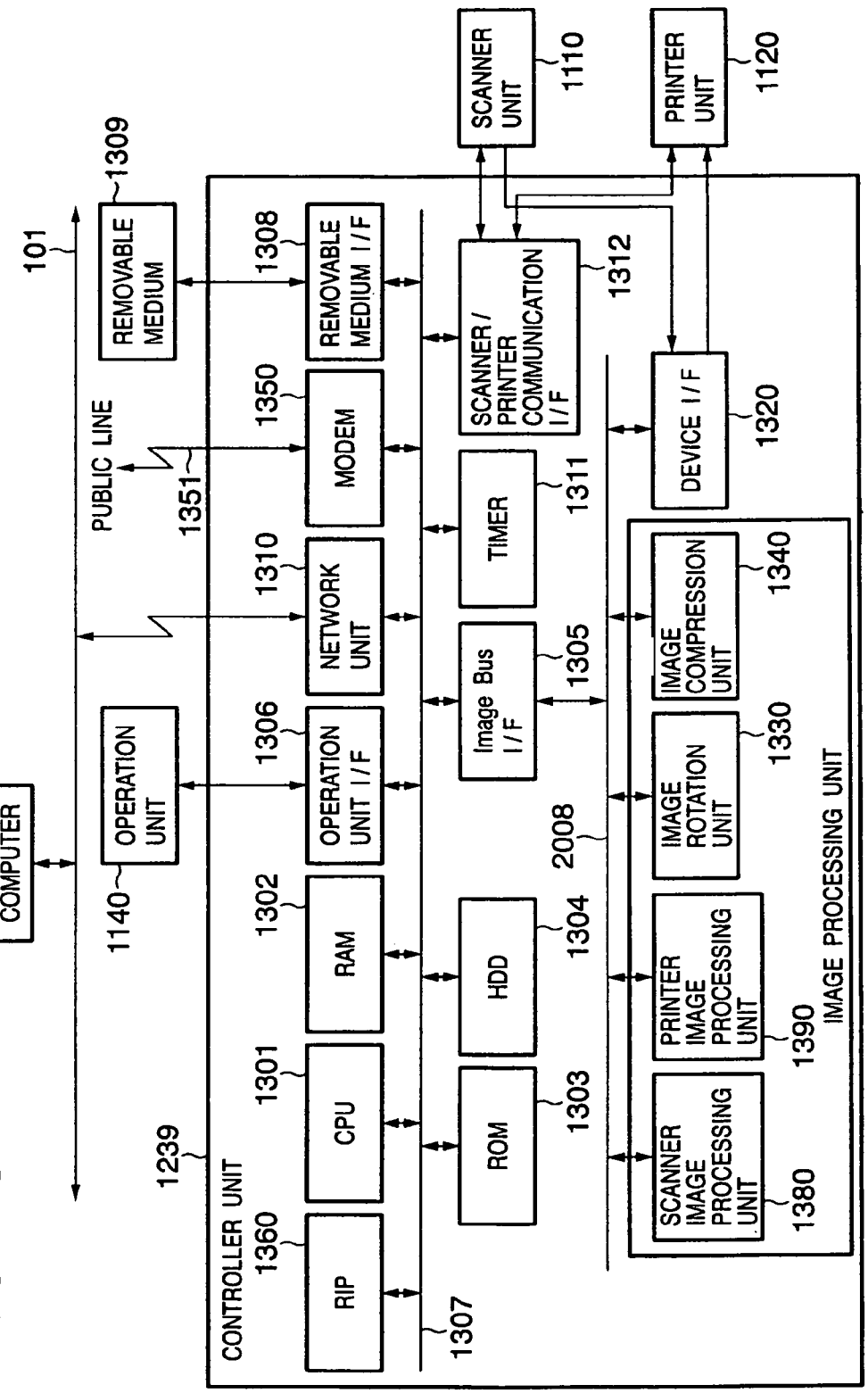
FIG. 13 is a block diagram showing an example of the hardware configuration of the controller unit of the printing apparatus 104 corresponding to the embodiment of the present invention.

In FIG. 13, a CPU 1301 is a control means for controlling the overall printing apparatus 104. A RAM 1302 is a work memory for operating the CPU 1301, and is an image memory for temporarily storing image data. A ROM 1303 is a boot ROM which stores the boot program of the printing apparatus 104.

An HDD 1304 is a hard disk drive which stores system software, image data, software counter values, and the like. A paper size-specific counter area and data process capacity-specific counter area are set for software counter values. The counter value is calculated and counted up using a preset arbitrary reference capacity value as a reference on the basis of the number of image outputs and the capacity of data processed by the CPU 1301. The HDD 1304 stores the device state, name, function, and the like as device information.

An operation unit I/F (interface) 1306 is an interface with the operation unit (UI: User Interface) 1140, and outputs, to the operation unit 1140, image data to be displayed on the operation unit 1140. Further, the operation unit I/F 1306 notifies the CPU 1301 of information inputted from the system user using the operation unit 1140. A network unit 1310 connects to the network 101, inputs/outputs output image data, and inputs/outputs information on device control, device information, or the like. In accordance with an input operation via the operation unit 1140, the network unit 1310 outputs an image by receiving output image data corresponding to the input operation via the operation unit 1140 from the host computer 102 on the network 101.

A modem 1350 connects to a public line 1351, and inputs/outputs information. A scanner/printer communication I/F (interface) 1312 is an interface for communicating with the CPUs of the scanner unit 1110 and printer unit 1120. The above-described devices are arranged on a system bus 1307.

A timer 1311 functions as a timer for issuing an interrupt at the time settings or predetermined time cycles of the printing apparatus 104 and controller unit 1239. An image bus I/F 1305 connects the system bus 1307 and an image bus 2008 for transferring image data at high speed, and converts the data structure. The image bus 2008 is formed from a host computer I bus or IEEE1394. The following devices are arranged on the image bus 2008. A raster image processor (RIP) 1360 expands a PDL code into a bitmap image. A device I/F (interface) 1320 connects the controller unit 1239 and the scanner unit 1110 and printer unit 1120 serving as image input/output devices, and performs synchronous/asynchronous conversion of image data.

A scanner image processing unit 1380 corrects, processes, and edits input image data. A printer image processing unit 1390 performs printer correction, resolution conversion, and the like for printout image data. An image rotation unit 1330 rotates image data. An image compression unit 1340 compresses/decompresses multilevel image data by JPEG and binary image data by JBIG, MMR, or MH. A removable medium I/F 1308 is an external interface capable of read/write from/in a removable medium 1309 such as an IC card, CD-ROM, or mobile hard disk. The type of the removable medium I/F 1308 is arbitrary (e.g. USB, PCMCIA, or DVD drive).

Figure 2:
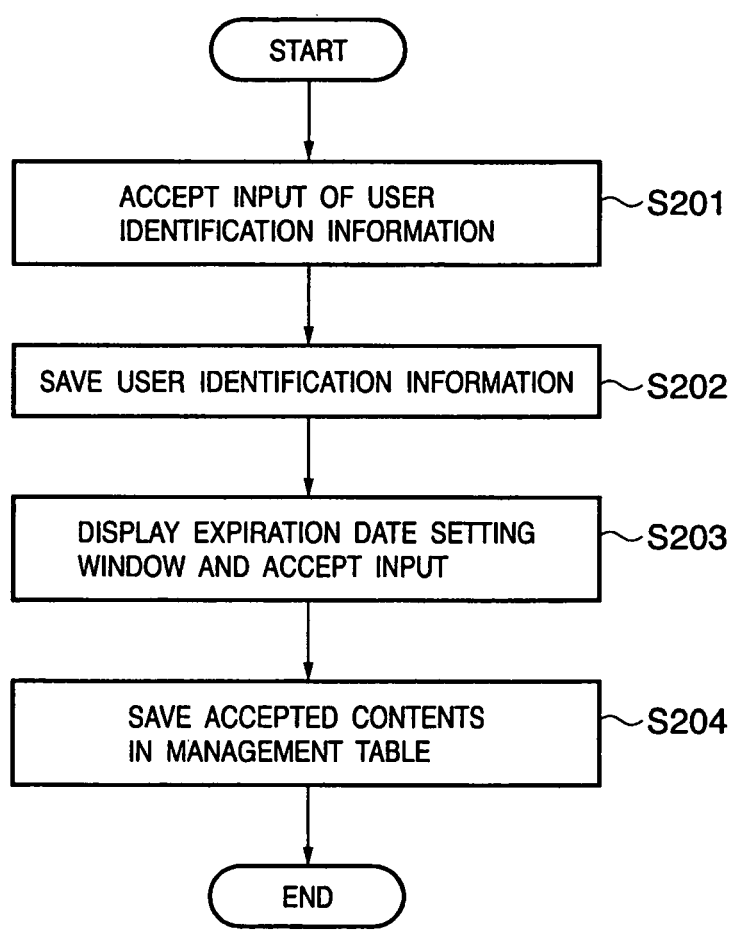
FIG. 2 is a flowchart corresponding to an example of an attribute information registration process in a printing apparatus 104 corresponding to the embodiment of the present invention.

A process of generating and managing user attribute information in the printing apparatus 104 corresponding to the embodiment will be explained. FIG. 2 is a flowchart corresponding to an example of the process. The attribute information is formed from user identification information, and setting items associated with conditions for registering the identification information in a management table 600 (to be described later).

In step S201 of FIG. 2, the printing apparatus 104 accepts, via the operation unit 1140 of the printing apparatus 104 from a user who searches for the printing apparatus 104 present on the network 101, input of information (user identification information) for specifying the user who executes search. The accepted input information suffices to be information for uniquely identifying an individual user, and corresponds to a log-in ID to the host computer 102, an employee ID, or the like.

In the process of step S201, a window as shown in FIG. 3 is displayed on the operation unit 1140. In FIG. 3, reference numeral 301 denotes a user identification information input area. The operation unit 1140 may display an input interface such as a virtual keyboard in addition to the input area, and the user can input a user ID via the input interface. User identification information may be inputted using hard keys such as a ten-key pad different from that for the display area on the operation unit 1140.

Reference numeral 302 denotes an OK button which is operated to finalize the contents of user identification information inputted to the input area 301. Reference numeral 303 denotes a cancel button which is operated to cancel the contents of user identification information inputted to the input area 301.

A case wherein the operation unit 1140 of the printing apparatus 104 is used will be described as an input example of user identification information. However, this is merely an example, and input of user identification information can also be accepted using an IC card which stores the user identification information, in addition to the above-mentioned method. Input may also be accepted by acquiring biometrics information using the fingerprint, iris, sign, voice print, palm vein, or the like, collating it with biometrics information stored in advance in the HDD 1304, and when these pieces of biometrics information coincide with each other, selecting corresponding user identification information.

In this manner, input of user identification information to the input area 301 is accepted in step S201. Then, the flow shifts to step S202. In step S202, the accepted user identification information is saved in the HDD 1304 of the printing apparatus 104.

Figure 4:
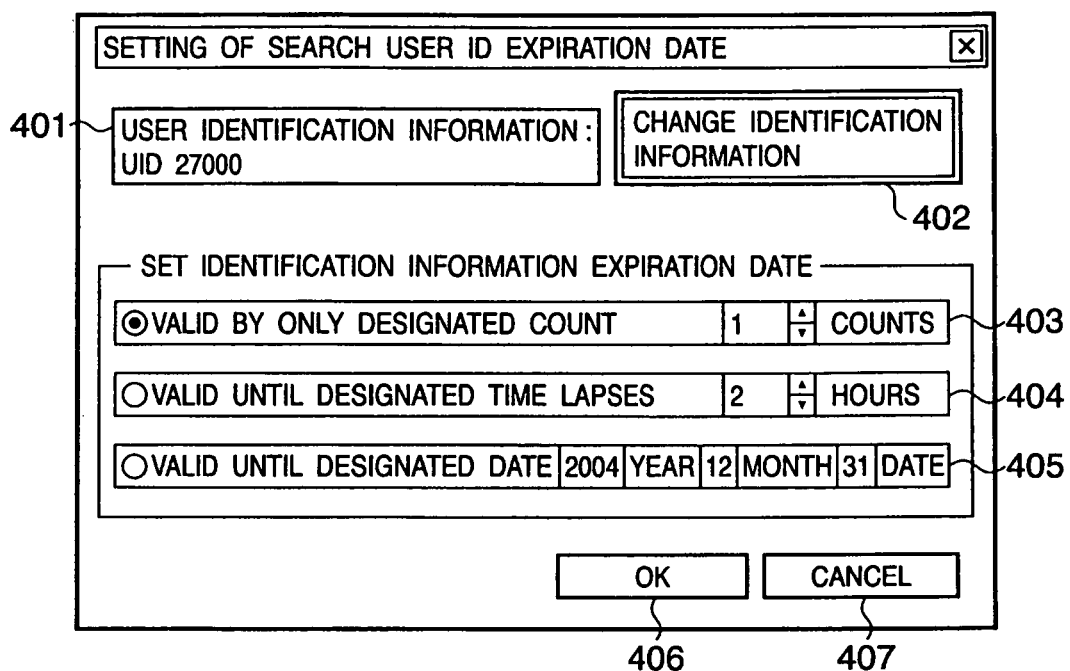
FIG. 4 is a view showing an example of an input window for setting the expiration date of attribute information corresponding to the embodiment of the present invention.

In step S203, window information for generating attribute information on the basis of the input user identification information is displayed in the display area of the operation unit 1140. FIG. 4 shows an example of a window displayed on the operation unit 1140. In the embodiment, an expiration date for registering user attribute information used to search for the printing apparatus 104 can be set from this window display.

In FIG. 4, a display area 401 displays the user identification information, input of which has been accepted in step S201. Reference numeral 402 denotes a button which is operated to change the user identification information displayed in the display area 401. When the button 402 is operated, the user identification information input window as shown in FIG. 3 is displayed to allow the user to directly input user identification information with a ten-key pad or virtual keyboard on the operation unit 1140. As described above, input of user identification information using an IC card or input of biometrics information is also possible.

Figure 5:
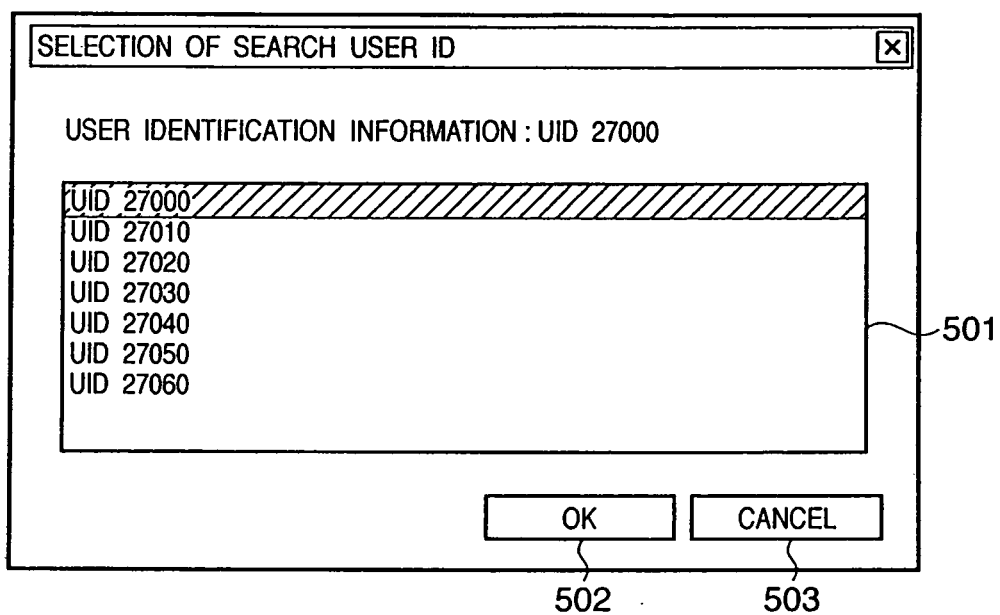
FIG. 5 is a view showing an example of a user identification information selection window corresponding to the embodiment of the present invention.

A user can also be selected from a list of pieces of user identification information of users who have already been registered. In this case, a user interface as shown in FIG. 5 is displayed on the operation unit 1140. The user can select his user identification information from the user identification information list.

In FIG. 5, reference numeral 501 denotes a display area where a user identification information list is displayed. FIG. 5 shows a state in which "UID 27000" is selected. Reference numeral 502 denotes an OK button which is operated to finalize selection in the display area 501. Reference numeral 503 denotes a cancel button which is operated to cancel selection from the user identification information list display and return to the display window in FIG. 4.

Referring back to FIG. 4, reference numerals 403, 404, and 405 denote setting areas for setting the expiration date of user identification information when the user searches for the printing apparatus 104 by using the user identification information. In the embodiment, when the user searches from the host computer 102 for the printing apparatus 104 on the network 101, he performs search using his user identification information, and only the printing apparatus 104 which saves the user identification information is contained in the search result. An expiration date until which the printing apparatus 104 saves user identification information is set. Only before the expiration date passes, the printing apparatus 104 is contained in a search result obtained when the user searches for the printing apparatus 104 by using the user identification information.

More specifically, the setting item 403 sets "valid by only designated count". The setting item 403 is a setting of holding attribute information which is generated on the basis of user identification information and used to search for the printing apparatus 104 until search for the printing apparatus 104 is executed by a count inputted to an edit box. That is, this count represents the upper limit of a count at which a device information transmission request is received.

In the example of FIG. 4, "1" is set in the setting item 403. After a user of user identification information "UID 27000" searches from the host computer 102 for the printing apparatus 104 once, attribute information generated in correspondence with the user identification information is erased.

The setting item 404 sets "valid until designated time lapses". The setting item 404 represents the expiration date of attribute information, and is a setting of holding attribute information which is generated on the basis of user identification information and used to search for the printing apparatus 104 until a time inputted to an edit box lapses.

In the example of FIG. 4, "2 hours" is set in the setting item 404. In this case, attribute information generated on the basis of user identification information is held two hours after generation, and then erased. Note that the setting is based on the unit "hour" in FIG. 4, but may be based on the unit "day", "week", "month" or the like.

The setting item 405 sets "valid until designated date". The setting item 405 also represents the expiration date of attribute information, and is a setting of holding attribute information which is generated on the basis of user identification information and used to search for the printing apparatus 104 until a date inputted to an edit box passes.

In the example of FIG. 4, "2004/12/31" is set in the setting item 405. In this case, attribute information generated on the basis of user identification information is held until 2004/12/31, and then erased.

In FIG. 4, one of the setting items 403 to 405 is selected. Alternatively, a plurality of items may be simultaneously selected, and when a condition at one of the items is satisfied, attribute information may be erased.

In step S204, the contents accepted in step S203 are saved in a management table for managing attribute information in the HDD 1304, and the process ends. FIG. 6 shows an example of the structure of the management table.

In FIG. 6, reference numeral 600 denotes a management table. The management table 600 stores user identification information and contents set at setting items in associated with each other.

More specifically, reference numeral 601 denotes an area which stores user identification information (UID). The user identification information may be inputted directly from the operation unit 1140 of the printing apparatus 104 or using an IC card or the like. The user identification information may be identification information issued on the basis of biometrical authentication which is performed on the basis of biometrics information registered in advance in the printing apparatus 104. A detailed description of the authentication will be omitted because user authentication can be performed using an arbitrary authentication method which is used widely and generally.

Reference numeral 602 denotes a flag representing which of selection items 403, 404, and 405 shown in FIG. 4 is valid. In the embodiment, when the flag is "1", the setting item 403 is validated; when the flag is "2", the setting item 404 is validated; and when the flag is "4", the setting item 405 is validated. Reference numeral 603 denotes a count designated in the "valid by only designated count" setting item 403. Since "1" is set, the designated count is one. In other words, if the printing apparatus 104 accepts one search from a user of the user identification information "UID 27000", attribute information is erased.

Reference numeral 604 denotes a time designated in the "valid until designated time lapses" setting item 404. In this case, "2" is set. After the lapse of two hours, attribute information is erased. The reference time at which counting of two hours starts is a setting date & time registered in an area 605. The setting date & time represents a date & time when user identification information is inputted and the expiration date is set. The lapse of two hours can be determined by using the time 605 as a reference, and referring to timepiece information in the printing apparatus 104. The lapse of two hours may also be determined using the timer 1311.

Reference numeral 606 denotes a date designated in the "valid until designated date" setting item 405. In this case, 2004/12/31 is set. Whether a designated date has passed can be determined by referring to timepiece information in the printing apparatus 104.

Reference numeral 607 denotes a count at which search using attribute information is accepted from a user corresponding to the user identification information 601. Since "0" is set, it represents that no search has been accepted after setting.

The management table manages setting information on the expiration date for each user identification information of even another user. Note that the management table can also store another information necessary for management in addition to the above items, but a description thereof will be omitted for convenience.

Processes executed in the host computer 102 and printing apparatus 104 when the host computer 102 searches for the printing apparatus 104 on the network 101 will be described.

A process of searching for the printing apparatus 104 on the network by the host computer 102 will be explained with reference to FIG. 7.

Figure 7:
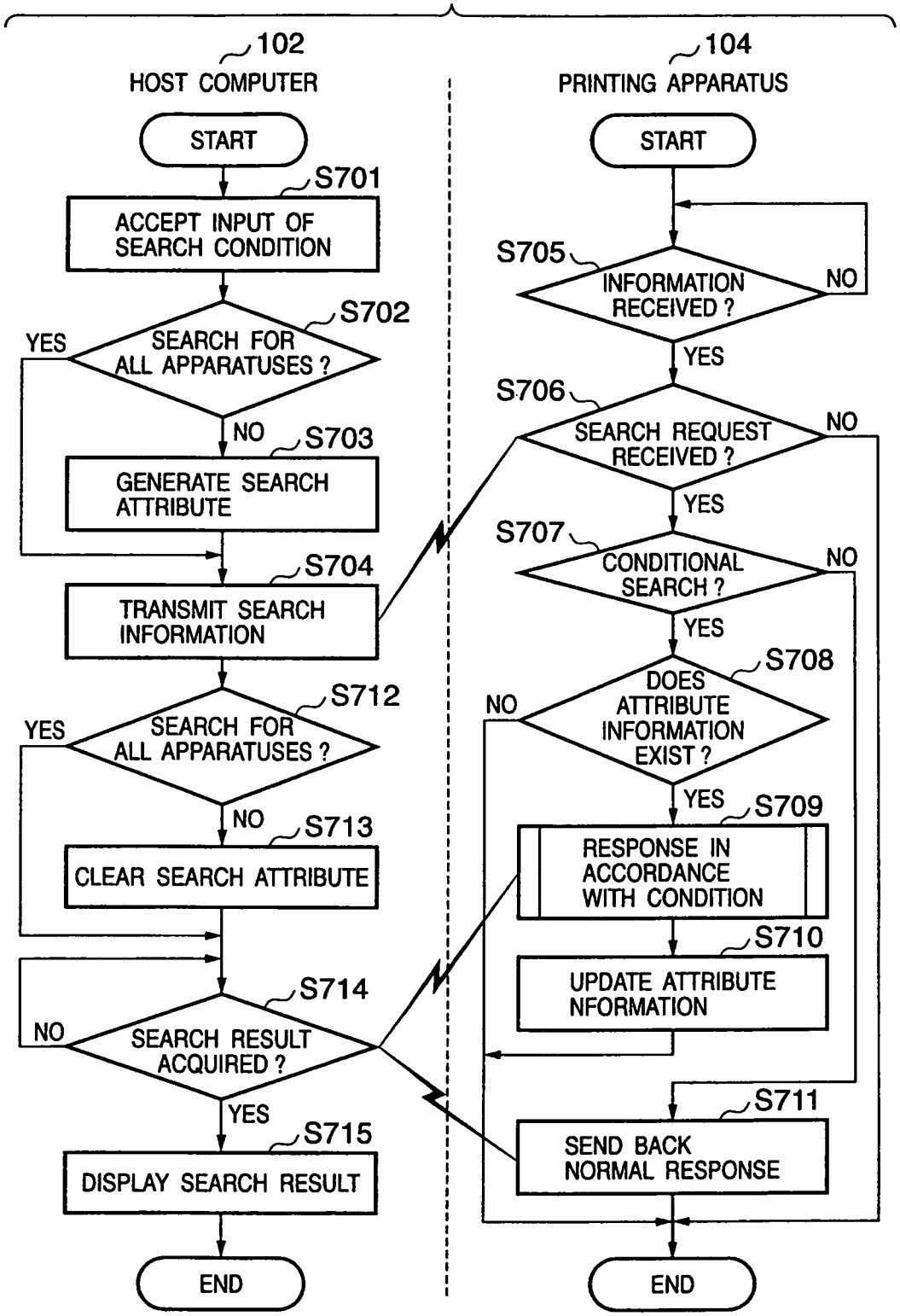
FIG. 7 is a flowchart corresponding to an example of a printing apparatus search process by a host computer 102 corresponding to the embodiment of the present invention.
Figure 8:
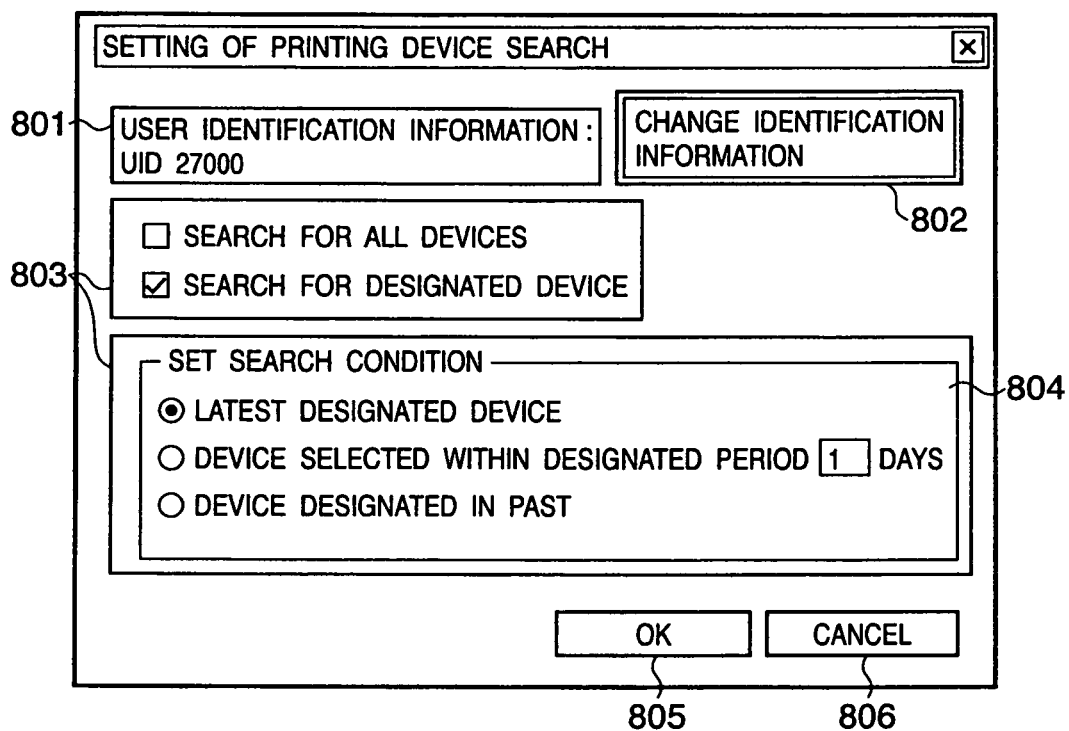
FIG. 8 is a view showing an example of a search condition input window corresponding to the embodiment of the present invention.

In step S701 of FIG. 7, the host computer 102 displays a window as shown in FIG. 8 on a display unit 1406, and accepts a search condition setting input from a user who is to search for the printing apparatus 104. The search condition is a condition associated with a device which requests transmission of device information. That is, transmission of device information is requested of a device which meets the search condition.

In FIG. 8, reference numeral 801 denotes an area where user identification information of a user who is to search from the host computer 102 for a printing apparatus is displayed. The displayed user identification information corresponds to user identification information registered as attribute information in the printing apparatus 104.

Figure 9:
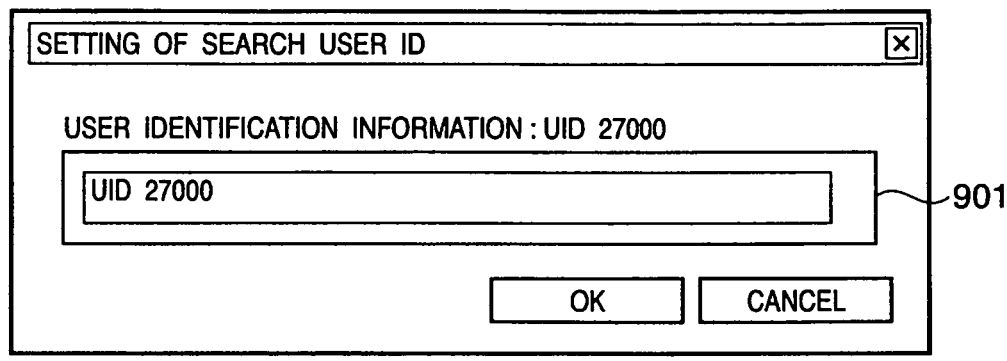
FIG. 9 is a view showing an example of a user identification information input window corresponding to the embodiment of the present invention.

As for acquisition of user identification information, a user ID setting window as shown in FIG. 9 may be displayed to accept an input. When user identification information coincides with a log-in ID for logging in to the host computer 102, a log-in ID acquired in logging in to the host computer 102 may be directly used.

Alternatively, a user ID may be acquired using Windows® domain authentication of the host computer 102, or user identification information may be acquired from an IC card as described above. Biometrics information registered in advance may be collated with biometrics information newly acquired from a user, and when these pieces of biometrics information coincide with each other, corresponding user identification information may be selected.

Reference numeral 802 denotes a button which is operated to change user identification information of a user who searches for the printing apparatus 104. When the button 802 is operated, a user ID setting window as shown in FIG. 9 is displayed to accept input of arbitrary user identification information.

Reference numeral 803 denotes a setting area for setting whether to search for all printing apparatuses 104 on the network 101 or only a printing apparatus 104 in which user identification information of the user is registered. In FIG. 8, "search for designated device" is selected. Note that neither "search for all devices" nor "search for designated device" is checked in a default state, and either item can be selected.

If "search for all devices" is selected, the item "search for designated device" is grayed out, and an area 804 for setting a search condition is also grayed out. To the contrary, if "search for designated device" is selected, "search for all devices" is grayed out, as shown in FIG. 8, and a selection operation in the area 804 is enabled.

The area 804 is used to set the search condition of the printing apparatus 104 designated by the user. In FIG. 8, for example, one of "latest designated device", "device selected within designated period", and "device designated in past" can be selected.

The "latest designated device" item can be selected to search for a device whose setting date & time is the latest in the management table 600. The "device selected within designated period" item can be selected to search for a printing apparatus 104 which is designated within a predetermined period inputted into an edit box (in which attribute information is registered). In FIG. 8, a period "1 day" is set. The "device designated in past" item is selected to search for a printing apparatus 104 which has been designated by the user in the past and has attribute information registered in the management table 600.

Reference numeral 805 denotes an OK button for finalizing setting contents; and 806, a cancel button for resetting setting contents.

Referring back to FIG. 7, the host computer 102, determines, in step S702 on the basis of the contents of the search condition accepted in step S701, whether to search for all printing apparatuses 104 on the network 101. That is, the host computer 102 determines whether "search for all devices" is selected at the setting in the area 803 of FIG. 8. If it is set to search for all printing apparatuses 104 ("NO" in step S702), the flow shifts to step S704. If it is not set to search for all printing apparatuses 104 ("YES" in step S702), the flow shifts to step S703.

In step S703, the host computer 102 generates a temporary attribute for searching for the printing apparatus 104. For example, when SNMP is used, a temporary attribute is generated by a method of, e.g., changing, to user identification information in search execution, an SNMP community name for establishing trust between the host computer 102 serving as a manager and the printing apparatus 104 serving as an agent. To "search for all devices", polling is performed by SNMP without changing the community name. In step S704, the host computer 102 requests the printing apparatus 104 on the network 101 to transmit device information. This transmission request contains the search condition set in FIG. 8.

In step S712, the host computer 102 determines again whether the search condition is to search for all devices. If the host computer 102 determines to search for all devices ("NO" in step S712), it clears in step S713 the attribute set in step S703. If the SNMP community name has changed, it is returned to a default community name. At the default setting, "public" is generally used as the community name. After that, the host computer 102 monitors reception of a response from the printing apparatus 104 in step S714.

A process by the printing apparatus 104 will be explained. The printing apparatus 104 serving as an agent monitors reception of information from the host computer 102 in step S705. Upon reception of the information, the printing apparatus 104 determines in step S706 whether it has received a search request from the host computer 102. More specifically, the printing apparatus 104 determines whether it needs to receive a search packet by SNMP or SLP and send back a response containing device information. If the printing apparatus 104 needs to send back a response ("YES" in step S706), the flow advances to step S707; if "NO" in step S706, the process ends and prepares for the next search request.

In step S707, the printing apparatus 104 determines whether the current search is conditional search. The conditional search means search performed when "search for designated device" is selected at the search condition setting in step S701. That is, in conditional search, the SNMP community name has been changed into user identification information. The management table 600 is searched on the basis of the user identification information to determine whether attribute information of the user exists, and then a response is sent back. If the search is not conditional one, "search for all devices" has been selected in step S701. In this case, a response is sent back regardless of the presence/absence of attribute information of the user who has performed the search.

If the printing apparatus 104 determines that the search is not conditional one ("NO" in step S707), the flow advances to step S711 to send back a normal response. The "normal response" is to provide MIB information to the host computer 102. The MIB information contains device information such as the device state, name, and function.

If the printing apparatus 104 determines that the search is conditional one ("YES" in step S707), the flow advances to step S708 to read out the management table 600 from the HDD 1304 and determine whether attribute information which coincides with the user identification information set in the SNMP community name is registered. If no attribute information is registered ("NO" in step S708), the process ends without sending back any response. If the attribute information is registered ("YES" in step S708), the printing apparatus 104 sends back a response corresponding to the condition on the basis of the attribute information and the search condition received from the host computer 102 in step S709.

Figure 10:
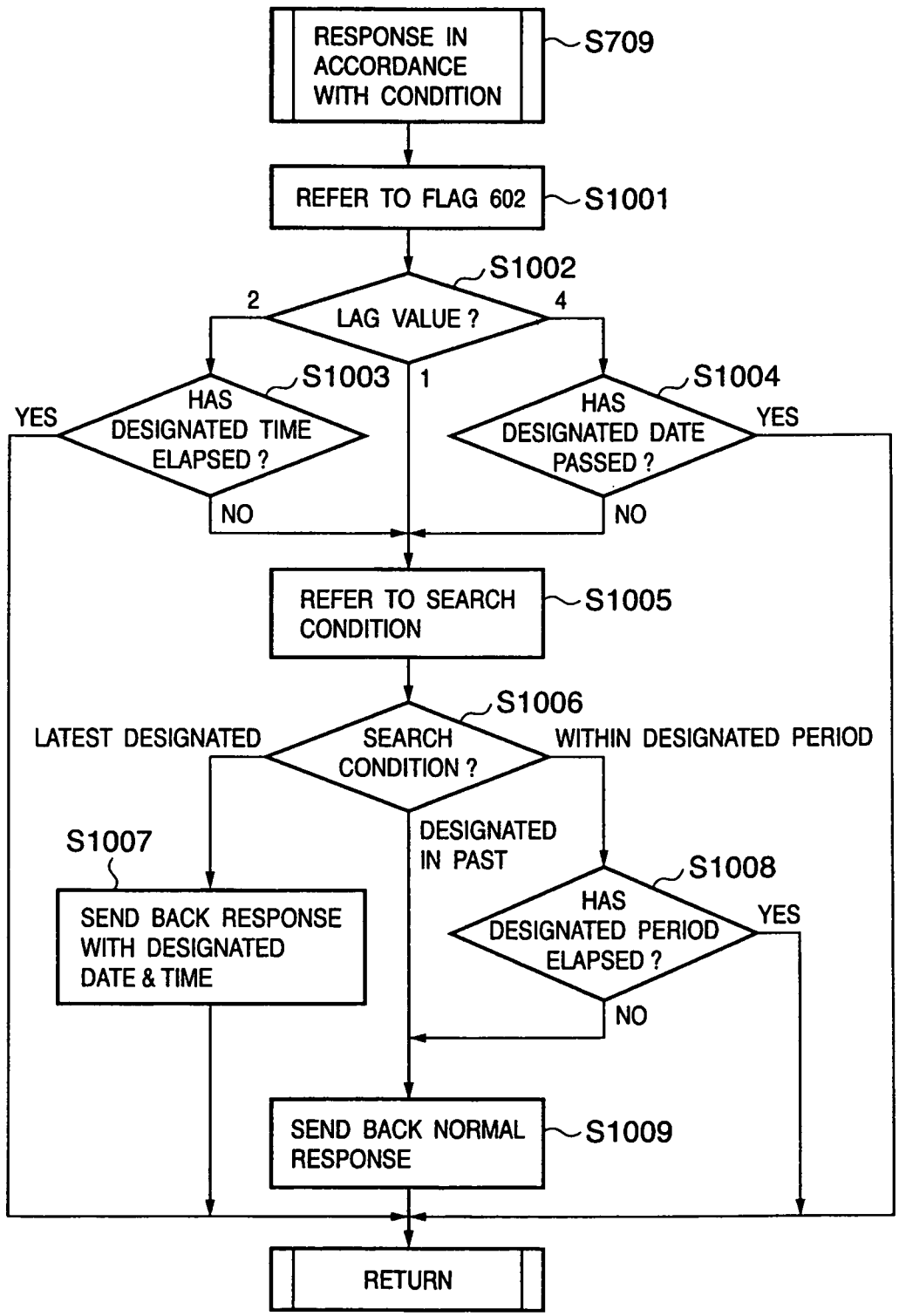
FIG. 10 is a flowchart corresponding to an example of a process by the printing apparatus 104 corresponding to the embodiment of the present invention.

An example of the flow of a concrete process in step S709 is shown in the flowchart of FIG. 10. In step S1001 of FIG. 10, the printing apparatus 104 refers to the value of the flag 602 in attribute information corresponding to the user identification information notified from the host computer 102. The value of the flag 602 takes one of "1", "2", and "4". If the value of the flag 602 is "1", the flow shifts to step S1005.

Note that if the flag 602 is "1", it is important whether the search count 607 is smaller than the designated count 603. If the search count 607 and designated count 603 coincide with each other, the attribute information should be erased from the management table 600 in the attribute information update information of step S710 in previous search. Thus, when step S709 is executed, the search count 607 and designated count 603 do not coincide with each other. Depending on the setting of an initial value, search may continue even if the search count 607 and designated count 603 coincide with each other. Even in this case, if the designated count 603 exceeds the limit of the designated count, the attribute information is also erased from the management table 600, and no process in step S709 is executed as described above.

If the flag 602 is "2", the printing apparatus 104 determines, on the basis of the current time and the setting date & time 605, whether the time (two hours in FIG. 6) designated by the designated time 604 of the attribute information has elapsed. If no designated time elapses ("NO" in step S1003), the flow shifts to step S1005. If the designated time has elapsed ("YES" in step S1003), the flow shifts to step S710 to update the attribute information. Since the attribute information has expired, it is erased from the management table 600.

If the flag 602 is "4", the printing apparatus 104 determines, on the basis of the current date & time and the designated date 606, whether the date & time (2004/12/31 in FIG. 6) designated by the designated date 606 of the attribute information has passed. If no designated date passes ("NO" in step S1004), the flow shifts to step S1005. If the designated date has passed ("YES" in step S1004), the flow shifts to step S710 to update the attribute information. Since the attribute information has expired, it is erased from the management table 600.

The printing apparatus 104 refers to the search condition notified from the host computer 102 in step S1005, and determines In step S1006 which of "latest designated device", "device selected within designated period", and "device designated in past" is set.

If "device designated in past" is designated, the printing apparatus 104 sends back a normal response in step S1009, as described above. If "latest designated device" is designated, the printing apparatus 104 embeds at least the setting date & time 605 of the attribute information in the MIB information, and sends back the setting date & time 605 to the host computer 102. If "device selected within designated period" is designated, the printing apparatus 104 determines, in step S1008 on the basis of the setting date & time 605, whether the designated period has elapsed. If the printing apparatus 104 determines that no designated period elapses ("NO" in step S1008), it sends back a normal response in step S1009, as described above.

After the process in step S1007 or S1009, the flow shifts to step S710 to update the attribute information. At this time, the search count 607 of the attribute information is updated to "1", and it is determined whether the search count 607 coincides with the designated count 603. If the search count 607 coincides with the designated count 603, the attribute information has expired and is erased from the management table 600.

If the printing apparatus 104 determines in step S1008 that the designated period has elapsed ("YES" in step S1008), the flow shifts to step S710 without sending back any response. Since no response is sent back in this case, the search count 607 need not be updated.

By the above process, update of the attribute information in step S710 is also completed, and then the process ends and prepares for the next search request.

The host computer 102 monitors reception of a response from the printing apparatus 104 on the network 101 in step S714. In step S715, the host computer 102 displays the search result on the display unit 1406 on the basis of the result of receiving a response from the printing apparatus 104.

Figure 15:
FIG. 15 is a view showing a display example of a search result corresponding to the embodiment of the present invention.

The obtained display result is shown in, e.g., FIG. 15. As shown in FIG. 15, information on a responding printing apparatus 104 as a result of search complying with a set condition is displayed. In FIG. 15, the device name, product name, network interface board name, and installation location are displayed. Note that the displayed information is not limited to them, and another information may also be displayed.

When the search condition is set to "latest designated device", the setting date & time 605 is contained in a response from the printing apparatus 104. The latest designated printing apparatus can be determined on the basis of the value of the setting date & time 605, and only information on the printing apparatus can be displayed as a search result.

In the above-described process, expired attribute information is erased from the management table 600 in updating the attribute information in step S710. However, the attribute information may be saved without erasing it from the management table 600, and when the search condition is set to "device designated in past", the printing apparatus 104 may send back a response to the host computer 102.

As has been described above, according to the invention corresponding to the embodiment, when the host computer acquires information on printing apparatuses in an environment where a plurality of printing apparatuses are connected to the network, a condition for narrowing the printing apparatuses to one whose information is to be acquired by the user can be arbitrarily set to acquire information from only a printing apparatus which satisfies the condition. The user can more easily acquire information on a desired printing apparatus.

Since user attribute information is saved with a time limit in the printing apparatus, the latest designated printing apparatus can also be obtained as a search result, or a printing apparatus designated within a predetermined period can also be obtained as a search result.

When the printing apparatus saves the user attribute information even after the expiration date, apparatus information can be acquired by distinguishing, among printing apparatuses on the network, a printing apparatus which has been designated by the user in the past from the remaining printing apparatuses.

Other Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-167346, filed Jun. 7, 2005, which is hereby incorporated by reference herein in its entirety.

What is claimed is:

1. A device which can communicate with an information processing apparatus via a network, comprising:
   a management unit constructed to manage identification information to be used as a search condition in a search request for the device, wherein the identification information is arbitrarily inputted into the device by a user;
   a communication unit constructed to receive a search request for the device from the information processing apparatus;
   a determination unit constructed to determine whether or not the search request received by said communication unit includes identification information as the search condition; and
   a control unit constructed to,
      when said determination unit determines that the search request includes the identification information and under conditions where the same identification information is managed by said management unit, control said communication unit to transmit a response to the search request and control said management unit to stop managing the identification information, and
      when said determination unit determines that the search request does not include the identification information and regardless of whether or not the same identification information is managed by said management unit, control said communication unit to transmit a response to the search request and control said management unit to continue managing the identification information.

2. A device according to claim 1, wherein
   said management unit comprises a management table for the identification information, and
   when said determination unit determines that the search request includes the identification information, said control unit controls said management unit to delete the identification information from the management table after the transmission of the response to the search request.

3. A device which can communicate with an information processing apparatus via a network, comprising:
   a storage unit that stores identification information to be used as a search condition in a search request for the device, and stores a predetermined number of times the identification information can be used as a valid search condition;
   a communication unit constructed to receive a search request for the device from the information processing apparatus;
   a determination unit constructed to determine whether or not the search request received by said communication unit includes identification information as the search condition; and
   a control unit constructed to,
      when said determination unit determines that the search request includes the identification information and under conditions where the same identification information is stored by said storage unit, control said communication unit to transmit a response to the search request and update the predetermined number of times stored by said storage unit, and
      when said determination unit determines that the search request does not include the identification information and regardless of whether or not the same identification information is stored by said storage unit, control said communication unit to transmit a response to the search request and refrains from updating the predetermined number of times stored by said storage unit.

4. A method for controlling a device which can communicate with an information processing apparatus via a network, comprising:
   a managing step of managing identification information to be used as a search condition in a search request for the device, wherein the identification information is arbitrarily inputted into the device by a user;
   a communication step of receiving a search request for the device from the information processing apparatus;
   a determining step of determining whether or not the search request received in said communication step includes identification information as the search condition; and
   a control step of,
      when it is determined in said determination step that the search request includes the identification information and under conditions where the same identification information is managed in said management step, causing the transmission of a response to the search request in said communication step and stopping the management of the identification information in said management step, and
      when it is determined in said determination step that the search request does not include the identification information and regardless of whether or not the same identification information is managed in said management step, causing the transmission of a response to the search request in said communication step and continuing the management of the identification information in said management step.

5. A method according to claim 4, wherein,
   in said managing step, the identification information is managed in a management table, and
   when it is determined in said determination step that the search request includes the identification information, the identification information is deleted from the management table after the transmission of the response to the search request in said management step.

6. A method for controlling a device which can communicate with an information processing apparatus via a network, comprising:
   a storing step of storing, in a storage of the device, identification information to be used as a search condition in a search request for the device, and storing a predetermined number of times the identification information can be used as a valid search condition;
   a communication step of receiving a search request for the device from the information processing apparatus;
   a determination step of determining whether or not the search request received in said communication step includes identification information as the search condition; and
   a control step of,
      when it is determined in said determination step that the search request includes the identification information and under conditions where the same identification information is stored in said storage step, causing the transmission of a response to the search request in said communication step and updating the predetermined number of times stored in said storage step, and when it is determined in said determination step that the search request does not include the identification information and regardless of whether or not the same identification information is stored in said storage step, causing the transmission of a response to the search request and refraining from updating the predetermined number of times stored in said storage step.

7. A non-transitory computer-readable storage medium which stores a program for causing a device which can communicate with an information processing apparatus via a network to execute a method comprising:

a managing step of managing identification information to be used as a search condition in a search request for the device, wherein the identification information is arbitrarily inputted into the device by a user;

a communication step of receiving a search request from the information processing apparatus;

a determining step of determining whether or not the search request received in said communication step includes identification information as the search condition; and a control step of, when it is determined in said determination step that the search request includes the identification information and under conditions where the same identification information is managed in said management step, causing the transmission of a response to the search request in said communication step and stopping the management of the identification information in said management step, and when it is determined in said determination step that the search request does not include the identification information and regardless of whether or not the same identification information is managed in said management step, causing the transmission of a response to the search request in said communication step and continuing the management of the identification information in said management step.

8. A non-transitory computer-readable storage medium which stores a program for causing a device which can communicate with an information processing apparatus via a network to execute a method comprising:

a storing step of storing, in a storage on the device, identification information to be used as a search condition in a search request for the device, and storing a predetermined number of times the identification information can be used as a valid search condition;

a communication step of receiving a search request for the device from the information processing apparatus;

a determination step of determining whether or not the search request received in said communication step includes identification information as the search condition; and a control step of, when it is determined in said determination step that the search request includes the identification information and under conditions where the same identification information is stored in said storage step, causing the transmission of a response to the search request in said communication step and updating the predetermined number of times stored in said storage step, and when it is determined in said determination step that the search request does not include the identification information and regardless of whether or not the same identification information is stored in said storage step, causing the transmission of a response to the search request in said communication step and refraining from updating the predetermined number of times stored in said storage step.

* * * * *